United States Patent

Hauck et al.

[15] 3,639,909

[45] Feb. 1, 1972

[54] MULTICHANNEL INPUT/OUTPUT CONTROL WITH AUTOMATIC CHANNEL SELECTION

[72] Inventors: Erwin Arthur Hauck, Arcadia; Jacob F. Vigil, Sierra Madre, both of Calif.

[73] Assignee: Burroughs Corporation, Detroit, Mich.

[22] Filed: Jan. 26, 1970

[21] Appl. No.: 5,545

[52] U.S. Cl. ........ 340/172.5

[51] Int. Cl. ........ G06f 3/04, G06f 13/00

[58] Field of Search ........ 340/172.5

[56] References Cited

UNITED STATES PATENTS

| | | | |
|---|---|---|---|
| 3,200,380 | 8/1965 | MacDonald et al. | 340/172.5 |
| 3,274,561 | 9/1966 | Hallman et al | 340/172.5 |
| 3,283,306 | 11/1966 | Patrusky | 340/172.5 |
| 3,286,240 | 11/1966 | Thompson et al. | 340/172.5 |
| 3,297,996 | 1/1967 | Grady | 340/172.5 |
| 3,303,476 | 2/1967 | Moyer | 340/172.5 |
| 3,398,405 | 8/1968 | Carlson et al. | 340/172.5 |
| 3,408,632 | 10/1968 | Hauck | 340/172.5 |
| 3,432,813 | 3/1969 | Annunziata et al. | 340/172.5 |
| 3,512,136 | 5/1970 | Harmon et al. | 340/172.5 |

*Primary Examiner*—Gareth D. Shaw
*Assistant Examiner*—Jan E. Rhoads
*Attorney*—Christie, Parker & Hale

[57] ABSTRACT

A multiplexed input/output system for controlling transfer of data between a large number of input/output units and a buffer memory on a time-shared basis over a small number of channels in which any one of several channels may be used to service any one of a number of input/output units through an input/output exchange. In response to the designation of a particular unit, special logic determines which of the several channels is to be used and establishes the proper connection between the selected channel and the designated input/output unit through the exchange.

5 Claims, 4 Drawing Figures

INVENTORS.
ERWIN ARTHUR HAUCK
JACOB FRANCIS VIGIL
BY
Christie, Parker & Hale
ATTORNEYS

MULTICHANNEL INPUT/OUTPUT CONTROL WITH AUTOMATIC CHANNEL SELECTION

FIELD OF THE INVENTION

This invention relates to digital data processing systems, and more particularly, is concerned with a multiplexed input/output control for transferring information between a plurality of input/output units and main memory.

BACKGROUND OF THE INVENTION

In U.S. Pat. No. 3,408,632 there is described a multiplexor control unit for transferring data to and from a plurality of peripheral units to one or more memory modules on a time-sharing basis. The control unit comprises a buffer storage for storing a plurality of words, the word storage capacity being less than the number of peripheral units. An associative tag memory is used for addressing the buffer storage with means responsive to an initiating control signal for storing the designation address of a particular peripheral unit in the associative memory and, at the same time, activating the corresponding peripheral unit. When a peripheral unit is ready to transfer information, either to or from a memory module, the peripheral unit generates an access signal and the access signal causes the associative tag memory to address an assigned word location in the buffer storage. A character is then transferred between the particular peripheral unit and the selected word location in the buffer storage. After each transfer of a character between a peripheral unit and the buffer storage, control is released and any other peripheral unit can communicate with another assigned word location in the buffer storage on a predetermined priority basis. In such an arrangement, the number of peripheral units in the system corresponds to the number of channels available for communication between the peripheral units and the buffer storage. Each channel requires a peripheral control unit which controls an associated input/output peripheral device.

SUMMARY OF THE INVENTION

The present invention is an improvement on the multiplexor system described in the above-identified patent. It provides a system in which a group of input/output devices communicate with the buffer memory over any one of several multiplexed channels by means of an exchange. When the processor calls for a transfer of data between memory and a designated input/output unit, group logic in the multiplexor selects one of the available channels associated with the designated unit and generates a coded address which is stored in the associative tag memory. At the same time, the group logic activates a peripheral control unit connected to the selected channel and provides an indication at the peripheral control unit of the designated one of the input/output units. The exchange then connects the designated input/output device to the selected peripheral control unit.

BRIEF DESCRIPTION OF THE DRAWINGS

For a more complete understanding of the invention reference should be made to the accompanying drawings wherein.

DETAILED DESCRIPTION

Figure 1:
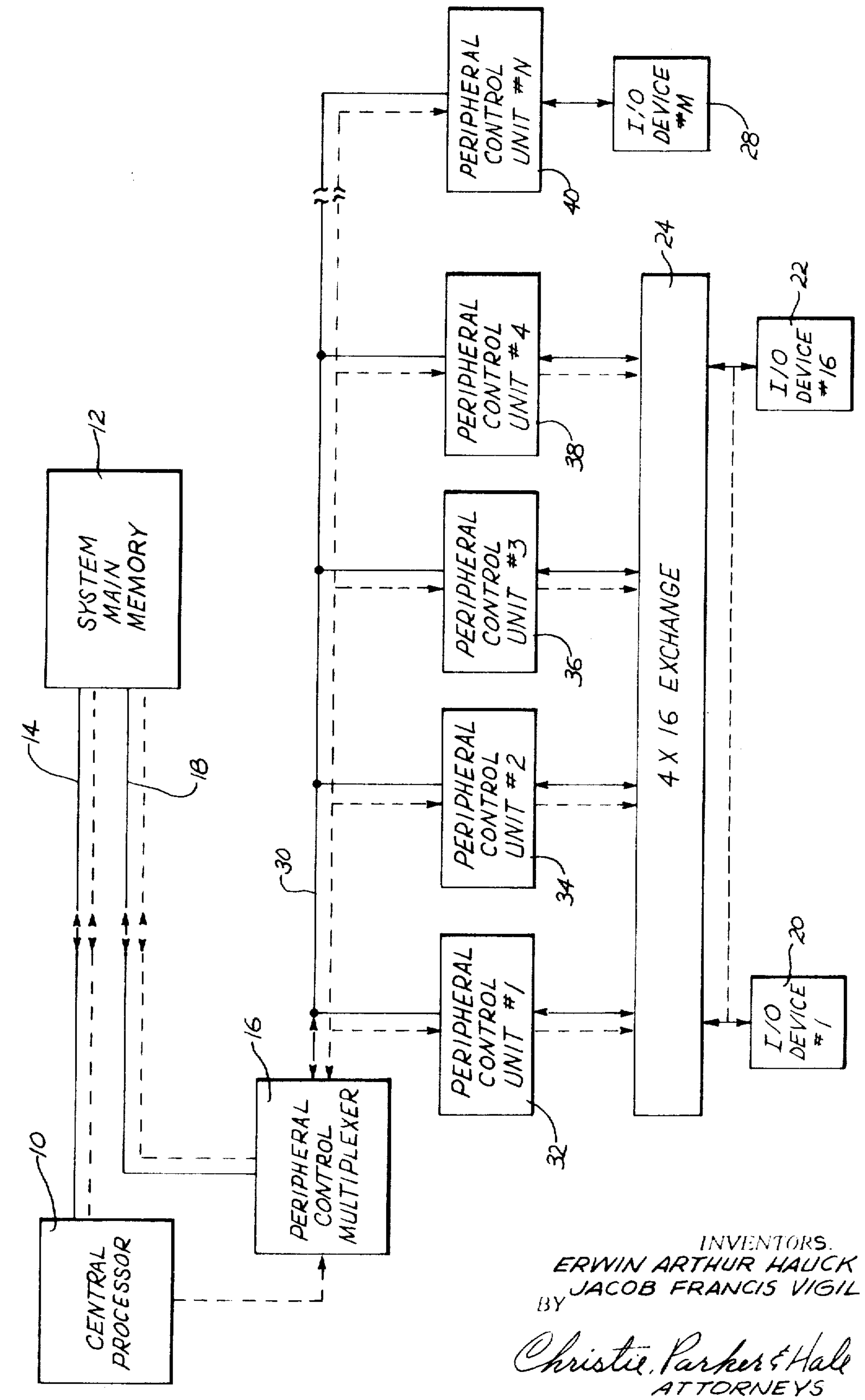
FIG. 1 is a simplified block diagram of a data processing system including an input/output subsystem.
Figure 2A:
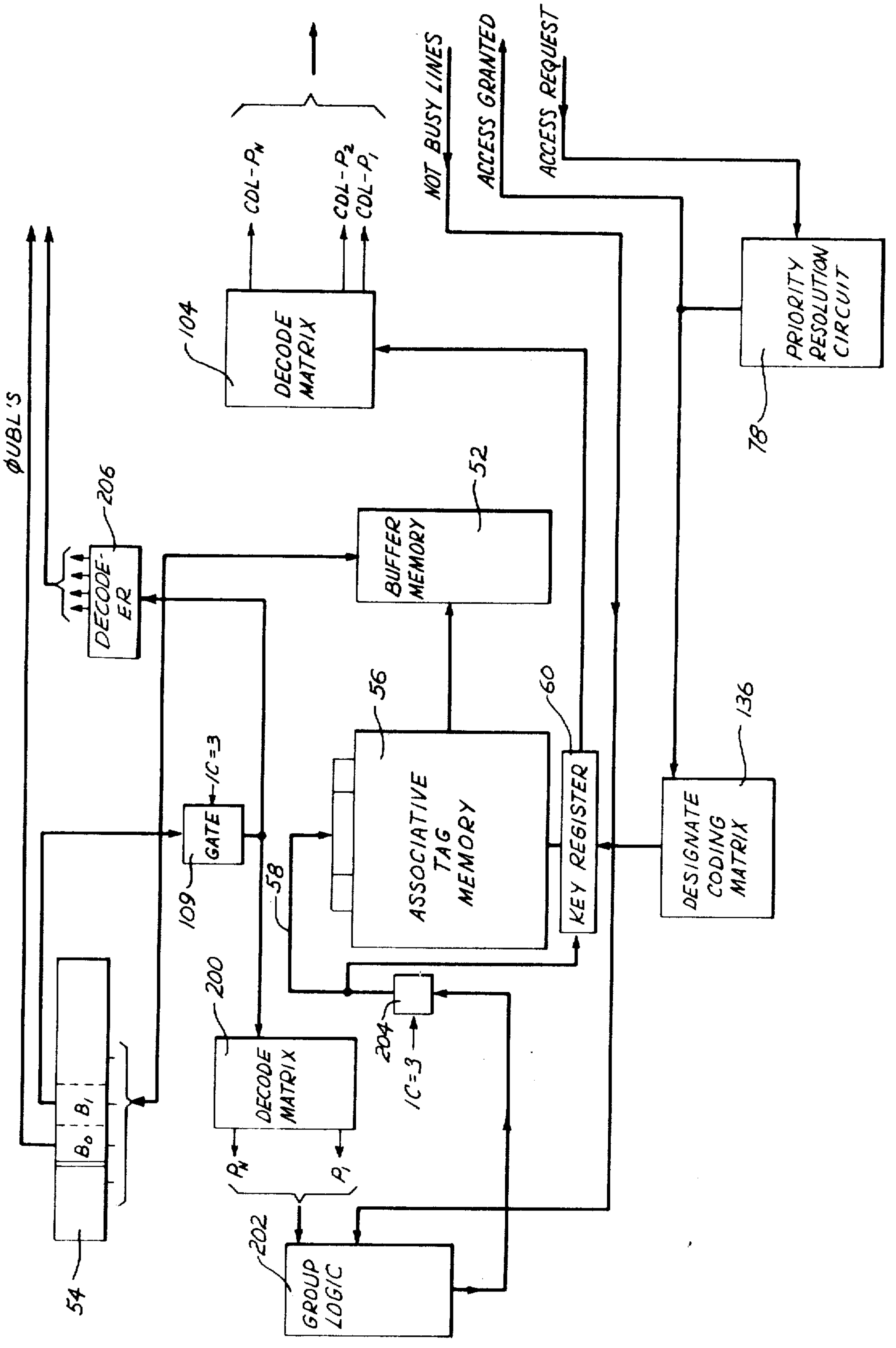
FIGS. 2A and 2B are schematic block diagrams of a portion of the multiplexor control unit incorporating the improvement of the present invention.
Figure 2B:
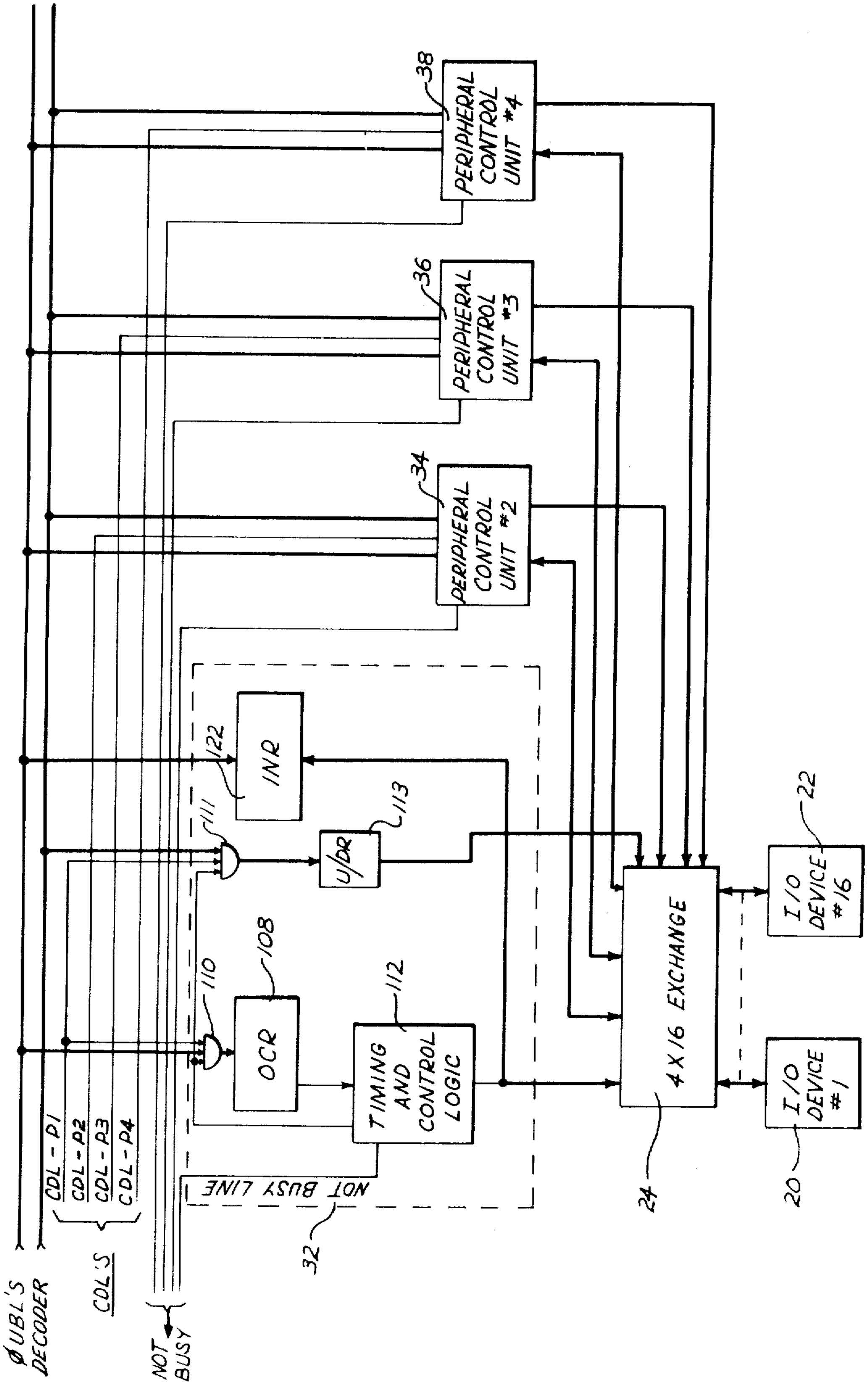

Referring to FIGS. 1 and 2 in detail, there is shown portions of a multiplexor control of the type described in detail in the above-identified U.S. Pat. No. 3,408,632. Portions of the multiplexor control which are common to the system described in the above-identified patent have been given corresponding reference numbers.

The data processing system includes a central processor 10 which communicates with a main memory 12. The main memory 12 may include a plurality of memory modules and a memory exchange in the manner described in U.S. Pat. No. 3,200,380, for example. Communication between the central processor 10 and the memory 12 is under the control of the processor over a data transfer bus 14. The input/output subsystem includes a peripheral control multiplexor 16 which communicates with the memory 12 over a data transfer bus 18. The peripheral control multiplexor 16 also communicates with a plurality of input/output devices, such as indicated at 20, 22, and 28, through a plurality of separate channels, each of which includes a peripheral control unit, such as indicated at 32 through 40. Communication between the multiplexor and the plurality of channels is through a common data transfer bus 30. Typically, the input/output devices may comprise magnetic tape units, message printers, card readers, card punches, disc files, magnetic drums, and the like. In addition to the data transfer buses there are control lines between each of the units as indicated by the dash lines in FIG. 1. According to the improvement of the present invention, communication between the peripheral control multiplexor 16 and a group of I/O devices, for example up to 16 in number, may be effected through a plurality of channels, for example up to four channels, through an exchange 24. The exchange may be a conventional cross-point switching exchange such as the I/O exchange described in U.S. Pat. No. 3,200,380.

In operation, as described in more detail in the above-identified U.S. Pat. No. 3,408,632, the central processor 10 signals the peripheral control multiplexor 16 when an input/output operation is to be initiated. The peripheral control multiplexor 16, when it is free, accesses the main memory 12 at a particular address location where an input/output descriptor has previously been stored, the descriptor providing all the information necessary to effect the desired transfer of information between a designated input/output device and a specified field in main memory. Each descriptor includes a group of bits defining the operation, such as reading information from a particular input/output device into memory or writing information into a particular input/output device from memory. Another group of bits in the descriptor designates the particular input/output device involved in the operation. Other bits define the number of words to be transferred and the base address of the field in memory used in transferring the data.

A number of descriptors can be stored in the peripheral control multiplexor 16 at one time. Once stored in the peripheral control multiplexor, the descriptors control the transfer of information between the designated input/output device and the main memory on a time-sharing basis using a buffer register.

Referring to FIG. 2 in detail, the peripheral control multiplexor includes a local storage buffer memory 52 which stores, for example, eight words. The number of words depends upon the maximum number of input/output devices which the system is designed to service on a time-sharing basis at one time. Input and output to the buffer memory 52 is through a storage buffer register 54. Words are transferred between the buffer register 54 and a particular word location in the buffer memory 52 in response to an associative tag memory 56. The associative tag memory is used to address the words in the buffer memory 52 by comparing a group of coded words in the associative tag memory with the contents of a key register 60. The number of coded words in the associative tag memory corresponds to the number of words in the buffer memory 52. The coded words in the associative tag memory can be changed in response to coded words applied to an input line 58. The associative tag memory 56 provides a means for assigning any one of the storage locations in the buffer memory to a designated one of the input/output channels and associated peripheral control units at the time an input/output operation is initiated between a particular input/output unit and the main memory 12, as described in detail in U.S. Pat. No. 3,408,632.

During an IC=1 state of an initiate cycle of operation by the timing and control logic (not shown), assuming no input/output device is seeking access to memory, a descriptor is transferred into the buffer register 54 from a predetermined location in main memory 12. The bits descriptor word includes a first byte or group of indicating the operation to be performed (OP code) that are stored in a section identified as $B_0$ in the register 54 the descriptor includes a second byte designating the particular input/output device to which the descriptor relates (Unit Designation) that is stored in a section labeled $B_1$ of the register 54. The unit designation bits in the section $B_1$ identify any one of the total possible input/output devices in the system. For example, assuming an eight-bit byte, $2^8=256$ different unit designations could be provided. These bits are transferred in parallel during the IC=3 state of the initiate cycle by a gate 109 to a decoding matrix 200 having plurality of output lines designated $P_1$ through $P_N$ where N corresponds to the number of input/output channels in the system. A typical system may include, for example, 20 such channels. The decoding matrix 200 converts a binary coded unit designation in the descriptor to an output designating the particular channel or channels which are capable of servicing the input/output units. The channels which service an identified unit may vary with each installation. The decoding matrix is therefore custom designed for each customer according to the selection and number of input/output devices and the associated channels used. The decoding matrix 200 is a conventional circuit, such as a diode matrix of the type described in the book entitled "Digital Computer Components and Circuits," by R. K. Richards, published in 1957 by D. Van Nostrand Company, on pages 57–59. The cross-points of the matrix are selected so that for each of the possible input bit combinations, one or more of the output lines is activated according to which channels are selected to service particular units. For example, in the configuration shown in FIG. 1, input/output devices 1 through 16 may communicate with the peripheral control multiplexor 16 over any of the four channels through the exchange 24. Thus the decoding matrix 200 would be arranged such that a unit designation corresponding to any one of the devices 1 through 16 and applied in binary coded form to the input of the matrix 200 from section $B_1$ of the register 54 causes lines $P_1$ through $P_4$ to all be true. If the unit designation corresponds to input/output device number M, the decoding matrix 200 activates the output line $P_N$, since channel N is assigned to I/O device M as shown in FIG. 1.

The output lines from the decoding matrix 200 are applied to a group logic circuit 202. Also applied to the group logic circuit 202 is a Not Busy line from each of the peripheral control units. The group logic circuit 202, in a manner hereinafter more fully described in connection with FIG. 3, in response to the status of the Not Busy lines, and the status of the output lines from the decoding matrix 200 generates a unique binary-coded character, which character identifies the particular channel and associated peripheral control unit to be assigned to the designated input/output device identified by the descriptor. The group logic circuit 202, based on the condition of the Not Busy lines and a predetermined priority assignment, selects which of the several possible channels is to be assigned where the designated input/output device is connected to an exchange. The output of the group logic circuit 202, which, for designating one of 20 channels, would be five bits in parallel, is applied through a gate 204 to the input lines 58 going to the associative tag memory 56. The lines 58 are also applied to the key register 60 for temporarily storing the channel designation character. The output of the Key register is applied to the tag memory and to a decoding matrix 104 which selectively energizes one of a plurality of Channel Designate lines, CDL-$P_1$ through CDL-$P_N$, depending on the binary value of the channel descriptor character. Each of these lines goes to a corresponding one of the peripheral control units to activate the associated peripheral control unit in the manner described in detail in the above-identified patent.

In particular, the Channel Designate line to the peripheral control unit number 1 is applied to an AND-circuit 110 which gates the OP code bits of the descriptor from the section $B_0$ of the register 54 over the UBL lines to the operation control register 108 in the peripheral control unit. At the same time, the output of a decoding matrix 206 is gated by an AND-circuit 111 into a register 113 in response to the same Channel Designate line. The decoding matrix 206, in response to the unit designation bits in section $B_1$ of the register 54, provides an indication of which of the I/O devices connected to the associated exchange is to be connected to the selected channel. Thus the decoding matrix 206 is shown as having four output lines, providing four parallel binary bits capable of identifying up to 16 different connections by an exchange to a maximum of 16 possible input/output devices. An exchange for connecting up to 16 devices is given by way of example. The decoding matrix 206 is a conventional circuit of the same type as matrix 200 in which the cross-point connections are selected such that, depending on the eight-bit input, the four-bit output identifies which connection in the associated exchange, if any, goes to the designated input/output device. This information is applied to the exchange 24 from the register 113 in the peripheral control unit to control the exchange such that the designated input/output device is connected by the exchange to the selected channel and associated peripheral control unit. At the same time, the timing and control logic 112 of the peripheral control unit changes the level on the associated Not Busy line to indicate that the particular channel is now in a busy status.

From the above description, it will be recognized that the system may service a large number of input/output devices by grouping the input/output devices and connecting them through an exchange to one or more input/output channels going to the multiplexor. The decoding matrix 200 in combination with the group logic circuit 202, in response to the unit designation value in the section $B_1$ of the buffer register 54 selects a particular channel in response to the unit designation number and a predetermined priority condition determined by the Not Busy lines and generates a coded value which is loaded in the associative tag memory. This coded value identifies the channel to be used in all communication between the designated input/output device and main memory.

Figure 3:
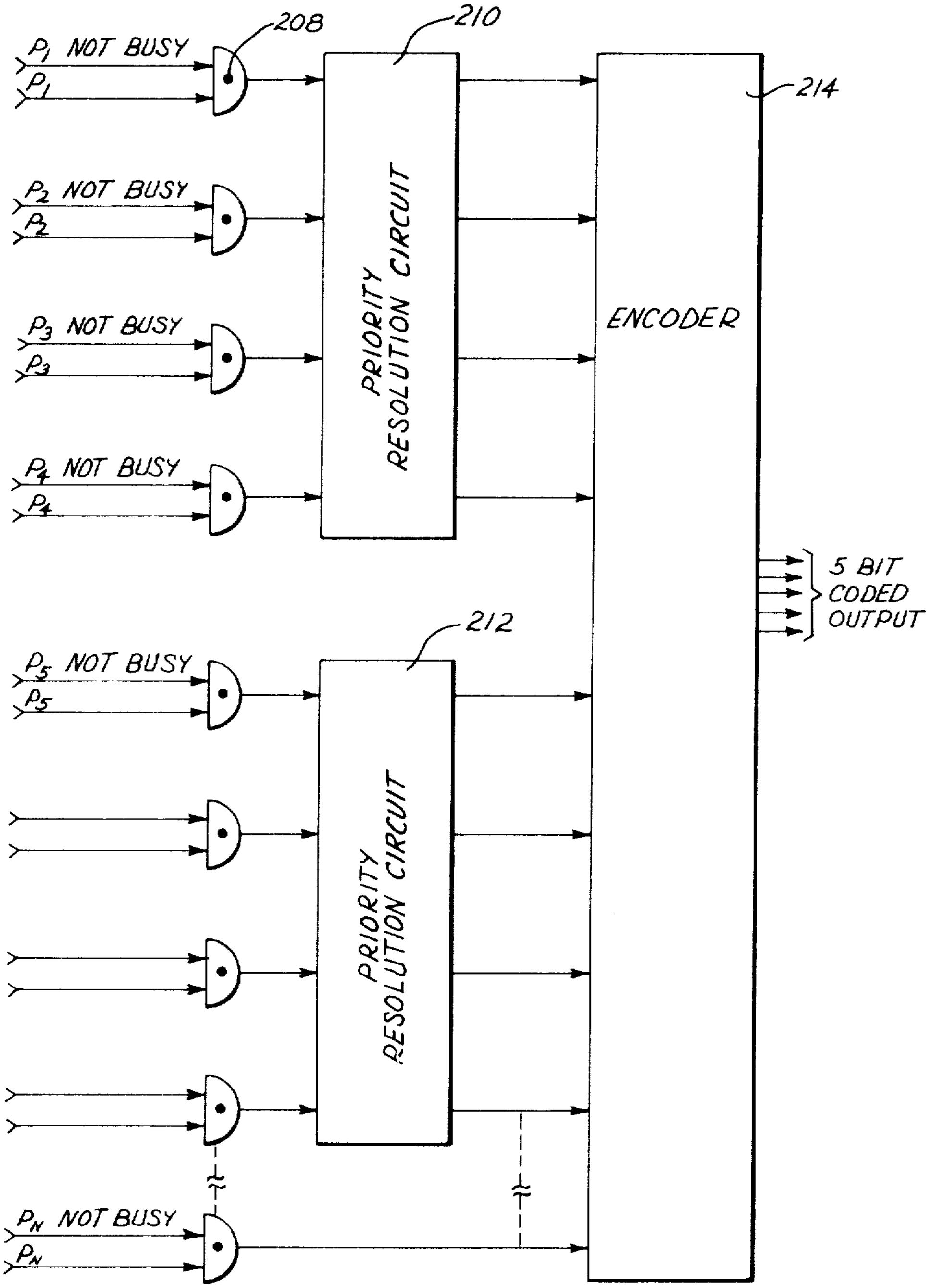
FIG. 3 is a schematic diagram of the group logic.

The operation of the group logic circuit 202 is shown in more detail in FIG. 3. Each of the output lines from the decoding matrix 200, designated $P_1$ through $P_N$, corresponds to one of the input/output channels. Each of these lines is applied to an associated AND-circuit 208 together with the Not Busy line from the corresponding peripheral control unit for the same channel. If the system configuration is arranged as shown in FIG. 1, in which the first four channels are connected to a common exchange, the first four AND circuits in the group control logic are connected to a common priority resolution circuit 210. Since a particular input/output device connected to the exchange 24 may be serviced through any one of the four channels, all four inputs to the priority resolution circuit 210 may be true at the same time. The priority resolution circuit 210 activates only one of the four outputs when more than one of the inputs is true.

Similarly, depending upon the desired system configuration, the next four channels may also be connected to an exchange. In this case the group logic circuit is provided with a second priority resolution circuit 212 which resolves priority between the outputs of the next four group of AND circuits, in the manner shown in FIG. 3. It should be noted that since the inputs to circuits 210 and 212 are never true at the same time, a single priority circuit may be time shared rather than having separate circuits as shown. The priority resolution circuits 210 and 212 are the same as the priority resolution circuit 78, described in detail in the above-identified patent. Once priority is resolved, only one of the N input lines to an encoder 214 can be true at a time in response to the unit designation value in the section $B_1$ of the buffer register 54. The encoder generates a binary coded output, such as a 5-bit code, which identifies the channel to be used and is connected to the associative tag memory in the manner described above. The encoder 214 is a conventional circuit for converting a one-out-of-N input to a binary-coded output. It will be apparent that the group logic circuit, in response to a particular unit designation number, selects and identifies only one channel and loads this channel identification character in the associative tag memory, even though the designated unit may be serviced by several channels through the exchange.

We claim:

1. Apparatus for initiating transfer of data between a buffer memory and a designated one of a plurality of input/output units over any one of several possible channels associated with the designated input/output unit, comprising: a register for storing a coded designation of a particular input/output unit, decoding means coupled to the register and responsive to said coded designation stored in said register for generating output signals identifying each of said channels associated with the designated input/output unit, means for indicating the channels that are not in a busy condition, code-generating means responsive to the output of the decoding means and the not busy condition indicating means for generating a coded output identifying a particular one of the possible channels associated with the designated input/output unit that is not in a busy condition, means responsive to the output of the code generating means for activating the corresponding channel to initiate transfer of data by the input/output unit, and switching means responsive to the coded designation in said register for connecting the designated one of the input/output units to said activated channel.

2. In a multiplexing system for transferring data between a plurality of input/output devices and a buffer memory, apparatus comprising: a plurality of peripheral input/output devices, a plurality of peripheral control units for controlling transfer of data into and out of said devices, at least one switching exchange for interconnecting a group of said devices with a group of the control units, the exchange permitting any one of the group of control units to be connected to any one of said devices, a register, means for setting a digitally coded designation of a particular one of said plurality of devices in the register, decoding means coupled to the register and responsive to the coded designation set in the register for identifying by a coded output each of the peripheral control units connectable to the designated device through an exchange, each of said plurality of peripheral control units including busy signal means for generating an output indicating if the control unit is available for controlling an input/output device, and means responsive to the output of the busy signal means and to the output of said decoding means for selectively activating one of the available peripheral control units connectable to the input/output unit designated by the register 3. Apparatus as defined in claim 2 further including an associative tag memory for addressing said buffer memory, and means responsive to the output of said priority means for storing an address corresponding to the activated peripheral unit in the associative memory.

4. Apparatus as defined in claim 2 further including means responsive to the contents of the register for generating a signal identifying a particular connection of the exchange with the designated device, means for coupling the signal to the selected peripheral control unit, means for storing said signal and for applying the signal to the exchange to complete the interconnection between the selected peripheral control unit and the designated device.

5. Apparatus for initiating transfer of data between any one of a plurality of peripheral devices and addressable storage, comprising: a multiplex control unit for controlling transfer of data between the addressable storage and a plurality of data channels on a time-shared basis, a plurality of peripheral control units, there being one peripheral control unit for each of said data channels, a switching matrix for interconnecting a group of said peripheral devices and a group of said peripheral control units, a control register in the multiplex control unit, means for initiating data transfer between memory and any one of said peripheral devices including means storing in said control register in coded form the designation of a particular peripheral device, means coupled to the control register for generating in response to the stored device designation a coded output identifying all the channels that are interconnectable with the designated peripheral device, each peripheral control unit including means for signaling the busy status of the peripheral control unit, logic means coupled to the channel identifying means and the busy status signals for generating a coded output identifying only one of said channels that is not busy on a fixed priority basis, decoding means coupled to the output of the logic means for selectively activating the peripheral control unit associated with the identified data channel, and means responsive to the device designation stored in the control register and the output of the logic means for controlling the switching matrix to complete a connection between the designated peripheral device and the selectively activated peripheral control unit.

* * * * *